United States Patent
Lee

(10) Patent No.: US 9,335,571 B2
(45) Date of Patent: May 10, 2016

(54) LIQUID CRYSTAL DISPLAY AND METHOD FOR REPAIRING ALIGNMENT LAYER USING THE SAME

(71) Applicant: Samsung Display Co., Ltd., Yongin, Gyeonggi-Do (KR)

(72) Inventor: Taek Joon Lee, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/480,746

(22) Filed: Sep. 9, 2014

(65) Prior Publication Data
US 2015/0268489 A1 Sep. 24, 2015

(30) Foreign Application Priority Data
Mar. 18, 2014 (KR) .................. 10-2014-0031842

(51) Int. Cl.
*B05D 5/06* (2006.01)
*G02F 1/13* (2006.01)
*G02F 1/1337* (2006.01)

(52) U.S. Cl.
CPC ............ *G02F 1/1309* (2013.01); *G02F 1/1337* (2013.01); *Y10T 428/1005* (2015.01); *Y10T 428/1018* (2015.01)

(58) Field of Classification Search
CPC ............... G02F 1/1309; G02F 1/1337; G02F 1/133711; G02F 1/133788; G02F 2011/133742; G02F 2011/133776; G02F 2201/506; Y10T 428/10; Y10T 428/1005; Y10T 428/1018; Y10T 428/1023
USPC ......... 428/1.1, 1.2, 1.25, 1.26, 1.27; 349/123, 349/130, 191; 445/2, 61, 14; 427/162
See application file for complete search history.

(56) References Cited

U.S. PATENT DOCUMENTS

| | | | |
|---|---|---|---|
| 6,660,341 B2 | 12/2003 | Andry et al. | |
| 7,880,844 B2 | 2/2011 | Onishi et al. | |
| 2009/0021680 A1* | 1/2009 | Onishi et al. | 349/124 |
| 2012/0092601 A1* | 4/2012 | Satoh | 349/123 |
| 2013/0101755 A1 | 4/2013 | Lee et al. | |
| 2013/0129965 A1 | 5/2013 | Jeong et al. | |
| 2013/0194525 A1 | 8/2013 | Lee et al. | |
| 2014/0063428 A1 | 3/2014 | Lee et al. | |
| 2014/0320790 A1 | 10/2014 | Lee et al. | |
| 2015/0062517 A1 | 3/2015 | Lee et al. | |
| 2015/0116643 A1 | 4/2015 | Suh et al. | |

FOREIGN PATENT DOCUMENTS

| | | |
|---|---|---|
| CN | 103064217 A | 4/2013 |
| CN | 103135286 A | 6/2013 |
| CN | 103246112 A | 8/2013 |
| CN | 104122719 | 10/2014 |
| EP | 2584400 A1 | 4/2013 |

(Continued)

*Primary Examiner* — Ruiyun Zhang
(74) *Attorney, Agent, or Firm* — Cantor Colburn LLP

(57) ABSTRACT

A liquid crystal display includes a substrate, an alignment layer disposed on the substrate and in which a pinhole is defined in the alignment unit, the alignment layer including an alignment unit including a vertical functional group and a photoreactive group, and a repair layer filled in the pinhole, wherein the repair layer and the alignment unit include a solvent and polymers, and the solvent of the repair layer and the alignment unit includes at least two materials with the same content, and a polymer content of the repair layer is less than a polymer content of the alignment unit.

7 Claims, 8 Drawing Sheets

(56) References Cited

FOREIGN PATENT DOCUMENTS

| | | |
|---|---|---|
| EP | 2597134 A2 | 5/2013 |
| EP | 2796923 | 10/2014 |
| JP | 4645823 B2 | 12/2010 |
| JP | 2013088803 A | 5/2013 |
| JP | 2013109353 A | 6/2013 |
| JP | 2014215614 | 11/2014 |
| KR | 1020050064888 A | 6/2005 |
| KR | 100858294 B1 | 9/2008 |
| KR | 101254593 B1 | 4/2013 |
| KR | 1020130048297 A | 5/2013 |
| KR | 1020130057153 A | 5/2013 |
| KR | 1020130089036 A | 8/2013 |
| KR | 1020140031668 A | 3/2014 |
| KR | 1020140127641 | 11/2014 |
| KR | 1020150047398 | 5/2015 |
| KR | 1020150026279 | 11/2015 |

\* cited by examiner

LIQUID CRYSTAL DISPLAY AND METHOD FOR REPAIRING ALIGNMENT LAYER USING THE SAME

This application claims priority to Korean Patent Application No. 10-2014-0031842, filed on Mar. 18, 2014, and all the benefits accruing therefrom under 35 U.S.C. §119, the entire contents of which are incorporated herein by reference.

BACKGROUND (a) Field

Exemplary embodiments of the invention relate to a liquid crystal display ("LCD") and a method for repairing an alignment layer, and particularly, to an LCD including an alignment layer having a repair layer filled in a pinhole, and a method for repairing an alignment layer in which a pinhole is defined.

(b) Description of the Related Art

A liquid crystal display ("LCD") is one of flat panel displays which are currently most widely used, and generally includes two sheets of display panels in which field generating electrodes such as a pixel electrode and a common electrode are formed, and a liquid crystal layer is interposed therebetween. The LCD displays an image by applying voltages to the field generating electrodes to generate an electric field in the liquid crystal layer, thereby determining an orientation of liquid crystal molecules of the liquid crystal layer and controlling polarization of incident light.

Among the LCDs, an LCD in a vertically aligned mode in which major axes of the liquid crystal molecules are aligned to be perpendicular to upper and lower display panels in a state in which an electric field is not applied to the liquid crystal layer has a high contrast ratio and a wide reference viewing angle, and therefore has received attention.

In order to implement the wide viewing angle in the LCD in the vertically aligned mode, a plurality of domains having different alignment directions of the liquid crystal may be formed in one pixel. As a method of forming the plurality of domains, a method of forming cutouts such as fine slits in a field generating electrode, a method of forming protrusions on the field generating electrode, etc., are used. These methods may form the plurality of domains by aligning the liquid crystal in a direction perpendicular to a fringe field by a fringe field formed between an edge of the cutout or the protrusion and the field generating electrode facing the edge.

The LCD in the vertically aligned mode may have degraded side visibility compared to front visibility. To solve the problem, a method of dividing the one pixel into two sub-pixels and making voltages of the two sub-pixels different has been proposed.

In order to make a response speed of the liquid crystal fast while implementing the wide viewing angle, a method of allowing a liquid crystal to have a pretilt in a state in which the electric field is not applied has been developed. To allow the liquid crystals to have the pretilts in several directions, an alignment layer having several alignment directions is used, or a reactive mesogen is added to the alignment layer or the liquid crystal layer and then light is irradiated to the alignment layer or the liquid crystal layer in the state in which the electric field is applied thereto, thereby forming the pretilt.

SUMMARY

The invention has been made in an effort to provide a liquid crystal display ("LCD") for repairing a pinhole that may be generated in a process for manufacturing an alignment layer, preventing generation of bad pixels by repairing configurations of a repair layer and an alignment unit to correspond to each other, and a method for repairing an alignment layer.

An exemplary embodiment of the invention provides an LCD including a substrate, a alignment layer disposed on the substrate and in which a pinhole is defined, the alignment layer including an alignment unit including a vertical functional group and a photoreactive group, and a repair layer filled in the pinhole, where the repair layer and the alignment unit include a solvent and polymers, the solvent of the repair layer and the alignment unit includes at least two materials with the same content, and a polymer content of the repair layer is less than a polymer content of the alignment unit.

In an exemplary embodiment, the alignment layer further includes a main chain and a plurality of side chains connected to the main chain, and includes the vertical functional group and the photoreactive group are disposed on the plurality of side chains of the alignment layer.

In an exemplary embodiment, the main chain includes at least one selected from a dianhydride and a diamine.

In an exemplary embodiment, the photoreactive group includes a reactive mesogen.

In an exemplary embodiment, the photoreactive group includes at least one selected from an acrylate and a methacrylate.

In an exemplary embodiment, the repair layer is provided by drying a repair solution, and the repair solution includes about 40 weight percent (wt %) to about 50 wt % of N-methyl pyrrolidone ("NMP"), about 30 wt % to about 40 wt % of butyl carbitol ("BC"), about 5 wt % to about 10 wt % of polycarbonate ("PC"), 5-20 wt % of an additive, and about 0.5 wt % to about 1.5 wt % of the polymer with regard to the entire weight of the repair solution.

In an exemplary embodiment, the alignment unit includes about 40 wt % to about 50 wt % of N-methyl pyrrolidone, about 30 wt % to about 40 wt % of butyl carbitol, about 5 wt % to about 10 wt % of polycarbonate, and about 5 wt % to about 20 wt % of an additive with regard to an entire weight of the alignment unit.

In an exemplary embodiment, the additive of the repair solution or the alignment unit is 3-methoxy-N,N-dimethylpropionamide, for example.

In an exemplary embodiment, viscosity of the repair solution is about 1.5 centipoise (cP) to about 3.0 cP.

Another embodiment of the invention provides a method for repairing an alignment layer, including: determining a position of a pinhole defined in an alignment layer including a vertical functional group and a photoreactive group; providing a repair solution in the pinhole; and forming a repair layer by drying the repair solution in a preparatory manner, where the repair layer and the alignment unit include a solvent and polymers; and the solvent of the repair layer and the alignment unit includes at least two materials with the same content, and a polymer content of the repair layer is less than a polymer content of the alignment unit.

In an exemplary embodiment, the method further includes, after the determining the position of the pinhole, checking whether the pinhole does or does not have a nucleus by photographing the pinhole using an optical instrument.

According to the embodiments of the invention, the pinhole that may occur during the process for manufacturing an alignment layer can be repaired through a simple process, and the part generated by repairing the pinhole of the alignment layer and the configuration of the alignment layer of its periphery are identical, so generation of bad pixels induced by repairing the pinhole can be prevented.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1A:
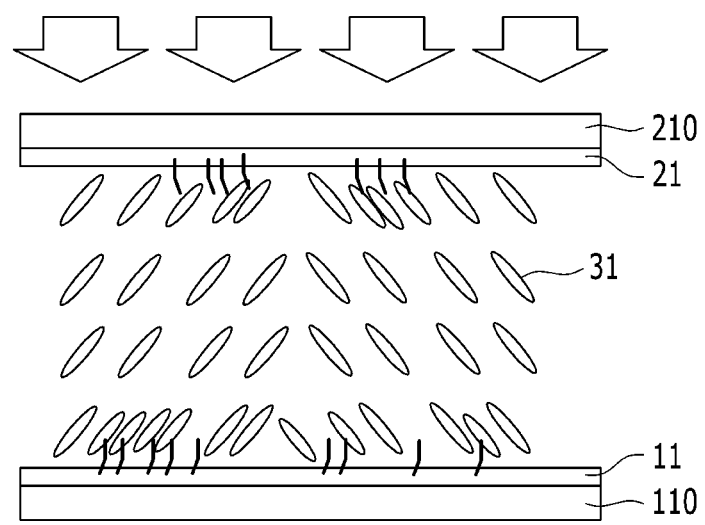
FIG. 1A shows a process for allowing liquid crystal molecules to have a pretilt by using an alignment layer including a photoreactive group such as ultraviolet rays according to an exemplary embodiment of the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A method for orienting liquid crystal molecules 31 to allow them to have a pretilt will be described with reference to FIGS. 1A and 1B.

Figure 1B:
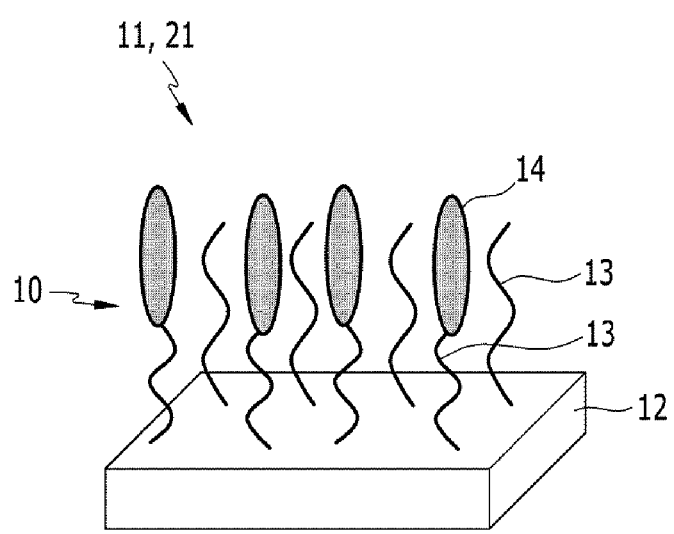
FIG. 1B shows a perspective view of an alignment layer.

FIG. 1A is a cross-sectional view illustrating a process of allowing liquid crystal molecules to have pretilts by using an alignment layer including a light reaction group with ultraviolet rays, for example, and FIG. 1B is a perspective view of the alignment layer.

Referring to FIGS. 1A and 1B, alignment layers 11 and 21 including an alignment material are disposed on two insulation substrates 110 and 210 facing each other, respectively.

The alignment layers 11 and 21 include a main chain 12 including a dianhydride and a diamine, and a plurality of side chains which are connected to the main chain 12. The side chains may respectively include a reactive mesogen 10 having at least two photoreactive groups, and a vertical functional group 13. A data voltage is applied to a first sub-pixel electrode 191a and a second sub-pixel electrode 191b shown in FIG. 5, and a common voltage is applied to a common electrode 270 of the upper panel 200 shown in FIG. 6 to generate an electric field to a liquid crystal layer 3 between the two display panels 100 and 200. Liquid crystal molecules 31 of the liquid crystal layer 3 may be slanted in a direction that is parallel with a length direction of the minute branches 194a, 194b, 194c, and 194d (see FIG. 7) in response to the electric field. In this instance, the liquid crystal molecules 31 may be slanted in four directions in one pixel.

When the electric field is generated to the liquid crystal layer 3 and rays such as ultraviolet rays are irradiated thereto, photoreactive groups 14 included in the reactive mesogen react with each other to provide a cross-linking portion. In an exemplary embodiment, the cross-linking portion may have a pretilt.

The reactive mesogen 10 included in the alignment layers 11 and 21 includes the vertical functional group 13 connected to the main chain 12 and the photoreactive group 14 connected to the vertical functional group 13. In another exemplary embodiment, the photoreactive group 14 may be directly connected to the main chain 12.

The reactive mesogen has a pretilt, and when a voltage is applied to the field generating electrodes 191 and 270, the liquid crystal molecules 31 may be aligned with a pretilt.

In an exemplary embodiment, a reaction initiator of a prepolymer may include an aryl ester group, and the photoreactive group 14 according to the exemplary embodiment of the invention may include an acrylate group or a methacrylate group, but are not limited thereto.

The process for repairing an alignment layer described with reference to FIGS. 1A and 1B will be described with reference to FIGS. 2, 3A, and 3B.

Figure 2:
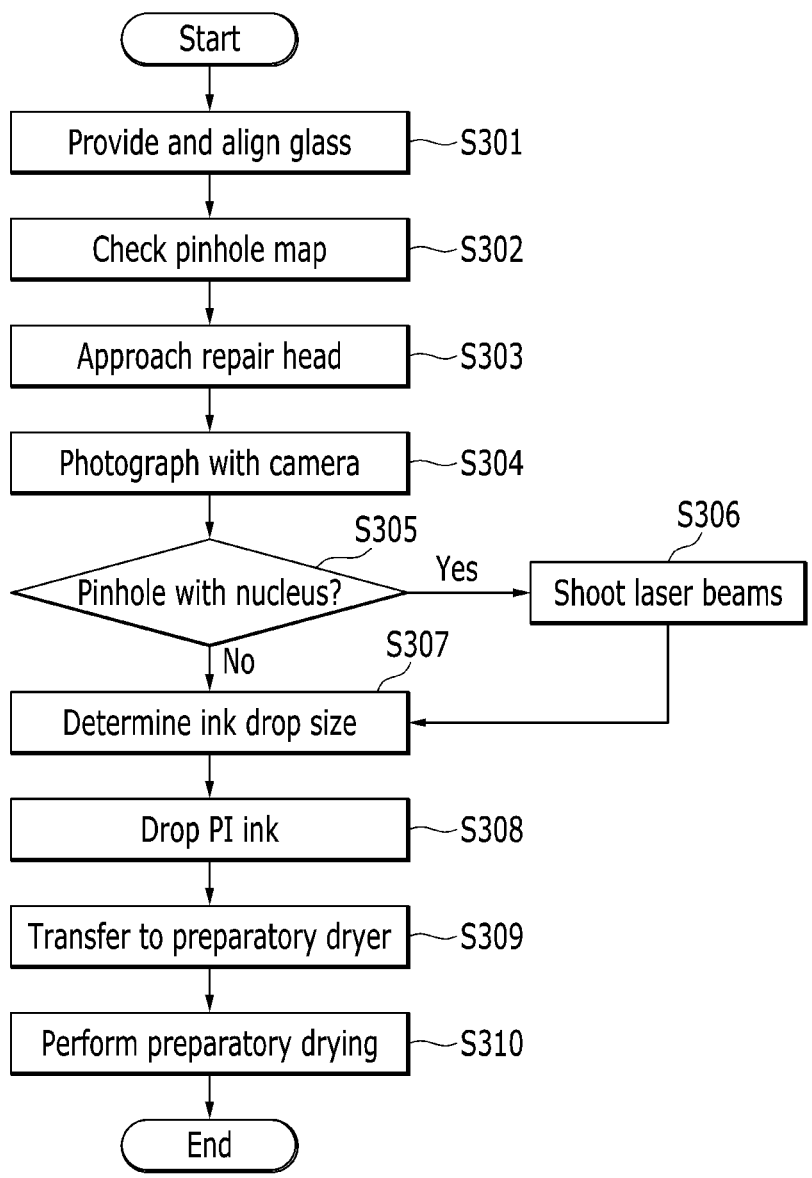
FIG. 2 shows a flowchart of an exemplary embodiment of a process for repairing an alignment layer according to the invention.
Figure 3A:
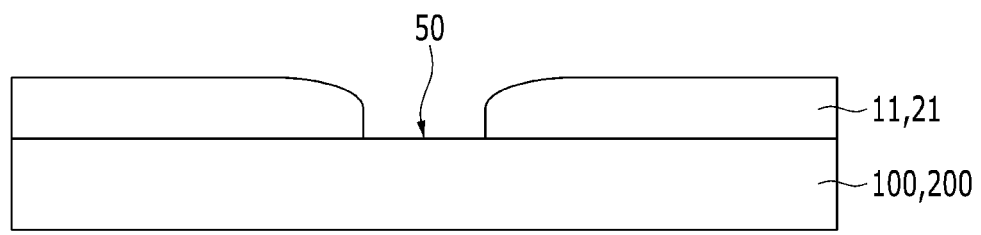
FIGS. 3A and 3B show a cross-sectional view of an exemplary embodiment of a partial process for repairing an alignment layer according to the invention.
Figure 3B:
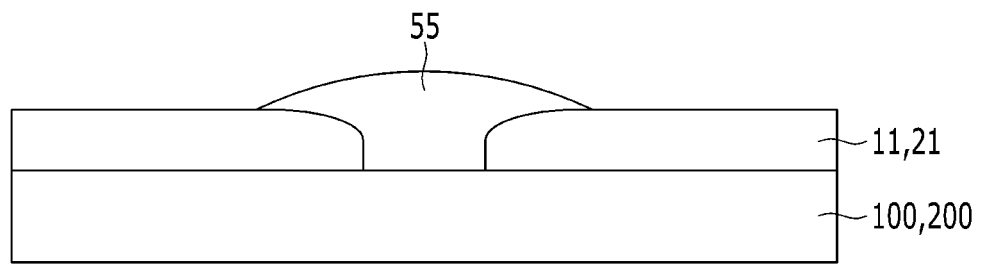

FIG. 2 shows a flowchart of a process for repairing an alignment layer according to an exemplary embodiment of the invention, and FIGS. 3A and 3B show cross-sectional views of a partial process for repairing an alignment layer according to an exemplary embodiment of the invention.

In the process for manufacturing an alignment layer described with reference to FIGS. 1A and 1B, problems may occur due to a pollution of the insulation substrates 110 and 210, bad printing conditions, or foreign materials, and such problems are referred to as pinholes. The pinhole of the alignment layer may appear as a problem of display quality while the liquid crystal panel is completed, so the pinhole must be removed through a repair process for generating a repair layer in the pinhole of the alignment layer.

Particularly, referring to FIGS. 2, 3A and 3B, since the alignment layer according to an exemplary embodiment of the invention has a configuration of a vertical functional group and a photoreactive group as described with reference to FIGS. 1A and 1B, the repair layer must be repaired so that the pinhole 50 may have a same configuration as the neighboring alignment unit.

In an exemplary embodiment, the pinhole 50 of the alignment layer may be classified as with-nucleus and without-nucleus, and foreign particles providing the nucleus may include dandruff, hair, dead skin cells, organic materials, inorganic materials, and metal particles, for example.

A repair process for removing the pinhole 50 of the alignment layer will now be described in detail.

The repair process includes providing a substrate (S301), checking a position of the pinhole 50 (S302), moving a repair head (S303), photographing the pinhole 50 using an optical instrument such as a camera (S304), checking whether the pinhole 50 does or does not have a nucleus (S305), removing a foreign particle by using laser beams when the pinhole 50 has a nucleus (S306), determine a provision amount of a solution, e.g., ink, for repairing the alignment layer (S307), providing the repair solution (S308), transferring to a preparatory dryer (S309), and performing a preparatory drying process (S310).

In an exemplary embodiment, a repair device of the alignment layer may include a repair head including a laser beam unit, a repair solution inkjet unit, and a photographing camera, and a scanner and a substrate fixing plate, for example.

The photographing camera receives coordinate values of the pinhole 50 recognized by the scanner, moves to a bad spot, photographs a size of the pinhole 50, and supplies information on the photographed pinhole 50 to the laser beam unit and the inkjet unit, and the laser beam unit irradiates laser beams and breaks foreign particles when the pinhole 50 has a nucleus. Also, the inkjet unit receives information about the size of the pinhole 50, controls a driving voltage of an oscillator, and partially prints an appropriate amount to a suitable position.

The scanner is used to detect the position of the pinhole 50, and checks coordinates of the pinhole 50 that may be provided on any points of the alignment layer.

The providing (S301) of the substrate includes providing the substrate on which the alignment layers 11 and 21 are provided to the alignment layer repair device, and may include a process for aligning the substrate.

The checking (S302) of a position of the pinhole 50 is a process for checking fronts of the alignment layers 11 and 21 disposed on the substrate by using the scanner disposed on the alignment layer repair device, and checking position information of the pinhole 50. In this instance, position information of the pinhole 50 may be calculated with the coordinates of the position.

The repair head is moved to the checked position of the pinhole 50 (S303), and the pinhole 50 is photographed (S304) by using the camera provided on the repair head so as to check whether the pinhole 50 does or does not have a nucleus (S305). This is because a process for removing the foreign particles remaining on the pinhole 50 is required when a nucleus is disposed in the pinhole 50.

Therefore, in the case of the pinhole 50 with a nucleus, a process (S306) for decomposing the foreign particles remaining in the pinhole 50 and removing the foreign particles by using the laser beams provided on the repair head may be additionally performed.

In the case of the pinhole 50 without a nucleus or the pinhole 50 with a nucleus, after the foreign particles are decomposed and removed by using laser beams in the case of having the nucleus, the provision amount of the solution for repairing the alignment layer is determined according to an area of the pinhole 50 (S307), and a repair layer 55 is provided by providing the repair solution to the pinhole 50 (S308).

When the repair solution is provided to the pinhole, the substrate is transferred to the preparatory drying unit (S309) to perform a preparatory drying process (S310) to dry the alignment layer in a preparatory manner.

FIGS. 3A and 3B show a process for providing the alignment layer repair layer 55 to the pinhole 50 and repairing the alignment layer.

In the process for repairing an alignment layer according to an exemplary embodiment of the invention, it is important to configure the repair layer 55, and the alignment layers 11 and 21 including a photoreactive group have a configuration provided with a vertical functional group and a photoreactive group, so when a configured component of the repair layer 55 provided to the pinhole 50 becomes different in the repair process, the part of the pinhole 50 when the repair process is performed and the configuration of the alignment layers 11 and 21 of the other part may become different, and this can be visible as a stain when the liquid crystal panel is completed.

Therefore, to prevent a spot being visible, the alignment layer repair layer 55 may include the same solvent and polymer as components of an alignment unit of the alignment layers 11 and 21. When a ratio of configured components of the alignment layer repair layer 55 corresponds to a ratio of a configured components of the alignment unit of the alignment layers 11 and 21, configured states of the part of the repaired pinhole 50 and other parts may correspond to each other.

Further, viscosity may be maintained to be low by adding a lesser amount of the polymer content in the alignment layer repair layer 55 than in the configured components of the alignment layers 11 and 21 so that the part of the repaired pinhole 50 in the alignment layers 11 and 21 may be provided to have the same height as the alignment layer of the other part.

In an exemplary embodiment, the repair solution forming the repair layer 55 may exemplarily include about 40 weight percent (wt %) to about 50 wt % of N-methyl pyrrolidone ("NMP"), about 30 wt % to about 40 wt % of butyl carbitol ("BC"), about 5 wt % to about 10 wt % of polycarbonate ("PC"), about 5 wt % to about 20 wt % of an additive, and about 0.5 wt % to 1.5 wt % of the polymer with regard to the entire weight of the repair solution. Here, the additive may be an additive that may function by reducing vapor pressure of the repair solution, and 3-methoxy-N,N-dimethylpropionamide may be used, but the invention is not limited thereto.

In an exemplary embodiment, the viscosity of the repair solution may be about 1.5 centipoise (cP) to about 3.0 cP depending on the contents of the polymer.

TABLE 1

| | Solvent configuration | | | | Polymer content | Viscosity |
|---|---|---|---|---|---|---|
| | NMP | BC | PC | Additive | | |
| Alignment layer solution | 40 wt % to 50 wt % | 30 wt % to 40 wt % | 5 wt % to 10 wt % | 5 wt % to 20 wt % | 3 wt % | 6.0 cP |
| Repair solution | Maintain the same component content ratio as solvent for alignment layer | | | | 0.5 wt % to 1.5 wt % | 1.5 cP to 3.0 cP |

This is because when the viscosity of the repair solution is less than 1.5 cP, the pinhole 50 in which the repair layer 55 is provided may be less thick than surroundings of the alignment layers 11 and 21, and when the viscosity of the repair solution is greater than 3.0 cP, the repaired pinhole 50 may be provided to be thicker than the surrounding of the alignment layers 11 and 21.

Figure 4:
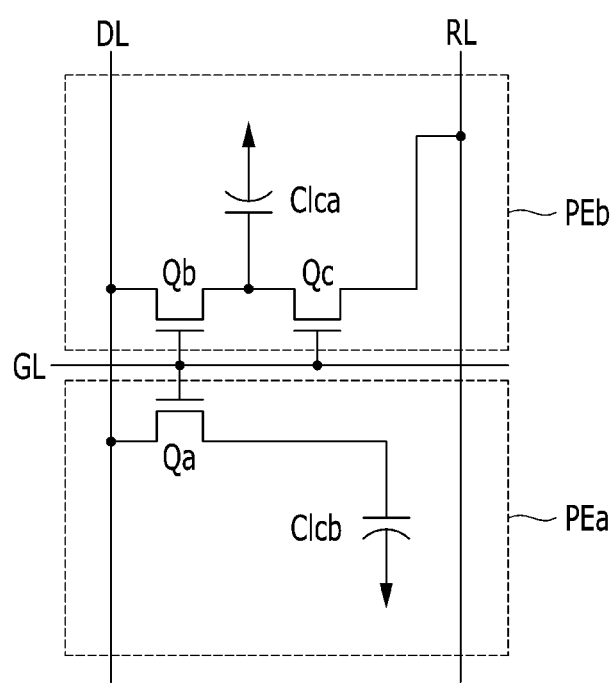
FIG. 4 shows an equivalent circuit diagram of an exemplary embodiment of a pixel of a liquid crystal display ("LCD") according to the invention.

A signal line and a pixel of a liquid crystal display ("LCD") according to an exemplary embodiment of the invention and a driving method thereof will now be described with reference to FIG. 4. FIG. 4 shows an equivalent circuit diagram of a pixel of an LCD according to an exemplary embodiment of the invention.

Referring to FIG. 4, a pixel PX of the LCD includes a plurality of signal lines including a gate line GL for transmitting a gate signal, a data line DL for transmitting a data signal, and a divided-voltage reference voltage line RL for transmitting a divided-voltage reference voltage, first, second, and third switching elements Qa, Qb, and Qc connected to the signal lines, and first and second liquid crystal capacitors Clca and Clcb.

Each of the first and second switching elements Qa and Qb is connected to the gate line GL and the data line DL, and the third switching element Qc is connected to an output terminal of the second switching element Qb and the divided-voltage reference voltage line RL.

In an exemplary embodiment, the first switching element Qa and the second switching element Qb are three-terminal elements such as thin film transistors ("TFTs"), control terminals thereof are connected to the gate line GL, input terminals thereof are connected to the data line DL, an output terminal of the first switching element Qa is connected to the first liquid crystal capacitor Clca, an output terminal of the second switching element Qb is connected to the second liquid crystal capacitor Clcb and an input terminal of the third switching element Qc.

The third switching element Qc is a three-terminal element such as a TFT, a control terminal thereof is connected to the gate line GL, an input terminal thereof is connected to the second liquid crystal capacitor Clcb, and its output terminal is connected to the divided-voltage reference voltage line RL.

When a gate-on signal is applied to the gate line GL, the first switching element Qa, the second switching element Qb, and the third switching element Qc connected thereto are turned on. The data voltage applied to the data line DL is applied to the first sub-pixel electrode PEa and the second sub-pixel electrode PEb through the turned on first switching element Qa and the second switching element Qb. In this instance, the data voltage applied to the first sub-pixel electrode PEa corresponds to the data voltage applied to the second sub-pixel electrode PEb, and the first liquid crystal capacitor Clca and the second liquid crystal capacitor Clcb are charged with a difference between the common voltage and the data voltage. Simultaneously, the voltage charged in the second liquid crystal capacitor Clcb is divided by the turned on third switching element Qc. The voltage charged in the second liquid crystal capacitor Clcb is accordingly reduced by the difference between the common voltage and the divided-voltage reference voltage. That is, the voltage charged in the first liquid crystal capacitor Clca becomes greater than the voltage charged in the second liquid crystal capacitor Clcb.

Therefore, the voltage charged in the first liquid crystal capacitor Clca becomes different from the voltage charged in the second liquid crystal capacitor Clcb. The voltage at the first liquid crystal capacitor Clca is different from the voltage at the second liquid crystal capacitor Clcb so the angles of the liquid crystal molecules in the first sub-pixel and the second sub-pixel become different and luminance of the two sub-pixels becomes different. Therefore, the image viewed from a lateral side may be controlled to be the closest the image viewed from a front by controlling the voltage of the first liquid crystal capacitor Clca and the voltage of the second liquid crystal capacitor Clcb, and lateral visibility may be improved.

A third switching element Qc connected to the second liquid crystal capacitor Clcb and the divided-voltage reference voltage line RL is included in order to make the voltage charged in the first liquid crystal capacitor Clca be different from the voltage charged in the second liquid crystal capacitor Clcb in the illustrated exemplary embodiment, and the second liquid crystal capacitor Clcb may be connected to a step-down capacitor in an LCD according to another exemplary embodiment of the invention.

In detail, it is possible to set a different charged voltage between the first liquid crystal capacitor Clca and the second liquid crystal capacitor Clcb by including a third switching element including a first terminal connected to a step-down gate line, a second terminal connected to the second liquid crystal capacitor Clcb, and a third terminal connected to the step-down capacitor, and charging a part of a charge stored in the second liquid crystal capacitor Clcb into the step-down capacitor. Further, in another exemplary embodiment of the invention, the first liquid crystal capacitor Clca and the second liquid crystal capacitor Clcb are connected to different data lines to receive different data voltages so the charged voltage between the first liquid crystal capacitor Clca and the second liquid crystal capacitor Clcb can be differently set. In an exemplary embodiment, the charged voltage between the first liquid crystal capacitor Clca and the second liquid crystal capacitor Clcb may be differently set by many other methods.

Figure 5:
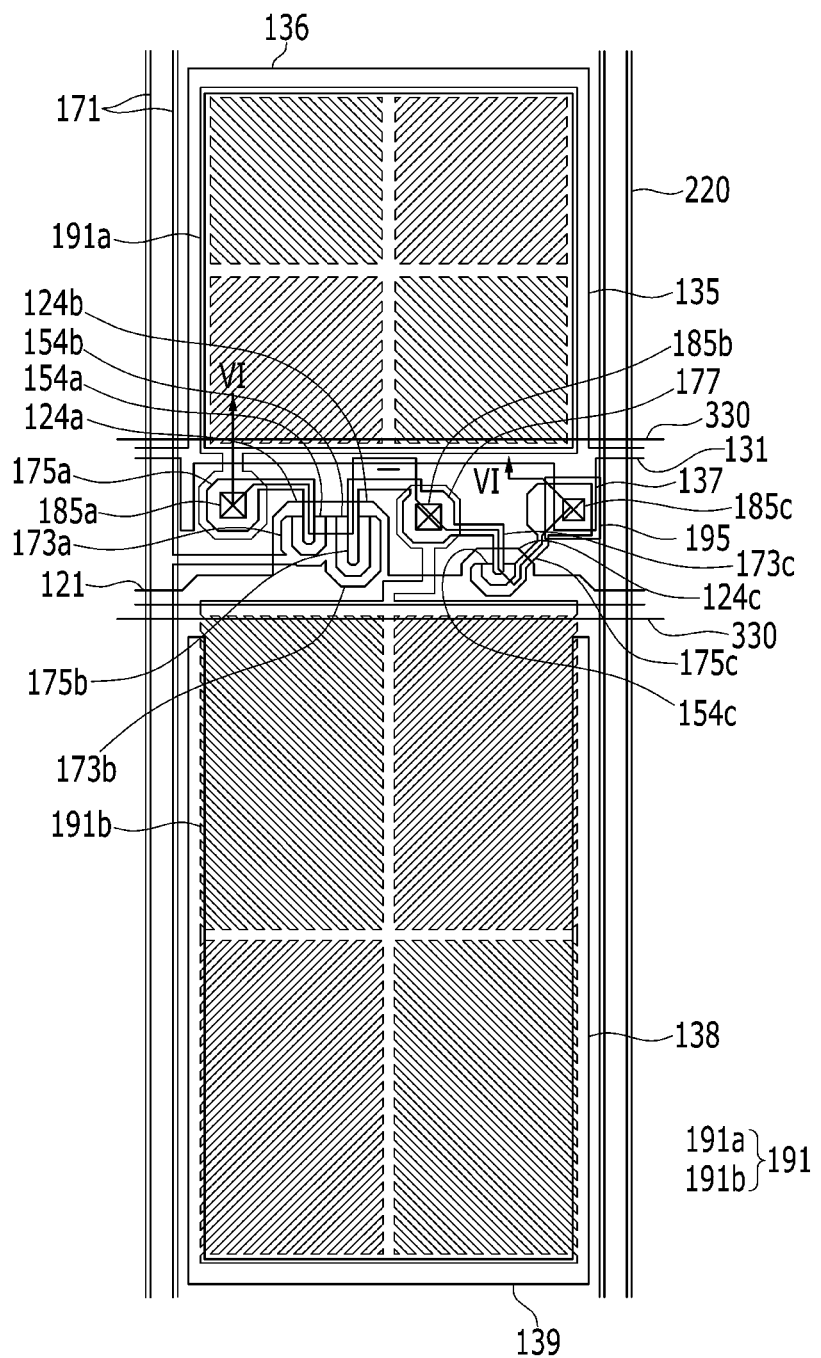
FIG. 5 shows a plan view of a pixel of an exemplary embodiment of an LCD according to the invention.
Figure 6:
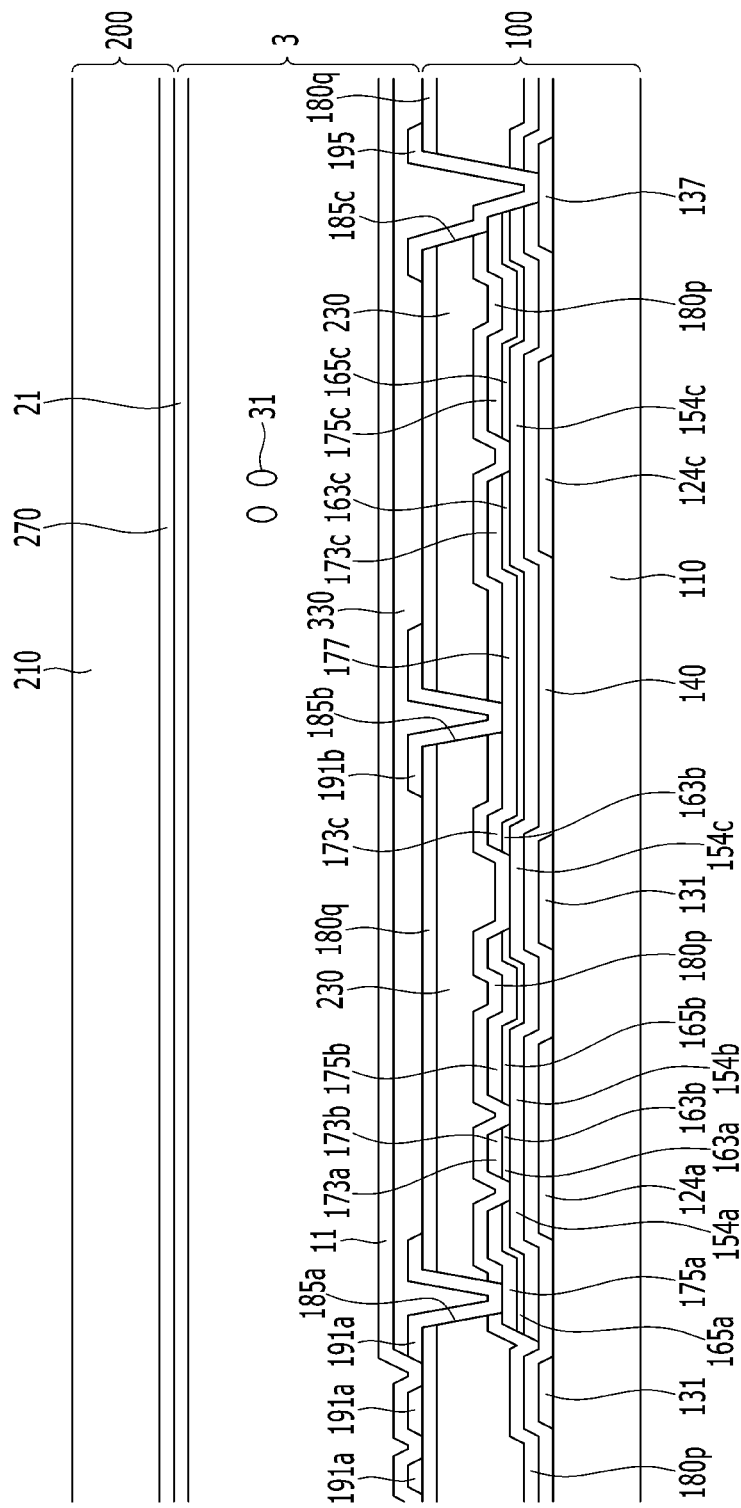
FIG. 6 shows a cross-sectional view taken along line VI-VI of FIG. 5.
Figure 7:
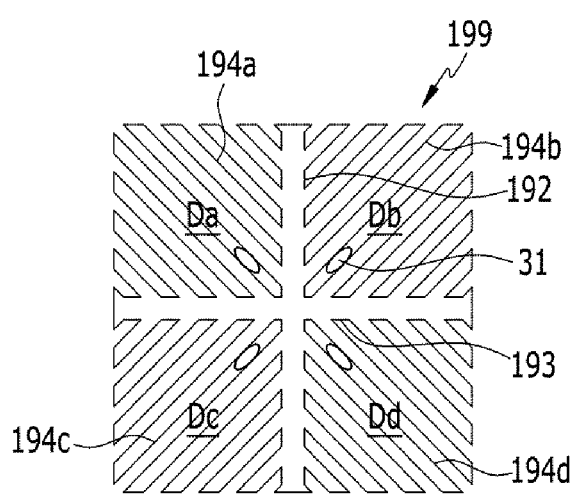
FIG. 7 shows a basic configuration of a pixel shown in FIG. 5.

A configuration of an LCD according to an exemplary embodiment shown in FIG. 4 will now be described with reference to FIGS. 5 to 7. FIG. 5 shows a plan view of a pixel of an LCD according to an exemplary embodiment of the invention, and FIG. 6 shows a cross-sectional taken along line VI-VI of FIG. 5. FIG. 7 shows a top plan view of a basic region of a pixel electrode of an LCD according to an exemplary embodiment of the invention.

Referring to FIGS. 5 and 6, the LCD includes the lower panel 100 and the upper panel 200 facing each other, the liquid crystal layer 3 provided between the display panels 100 and 200, and a pair of polarizers (not shown) attached to external sides of the display panels 100 and 200.

The lower panel 100 will now be described.

In an exemplary embodiment, a gate conductor including a gate line 121 and a divided-voltage reference voltage line 131 is disposed on the insulation substrate 110 including transparent glass or plastic, for example.

The gate line 121 includes a first gate electrode 124a, a second gate electrode 124b, a third gate electrode 124c, and a wide end portion (not shown) for access to another layer or an external driving circuit.

The divided-voltage reference voltage line 131 includes first storage electrodes 135 and 136 and a reference electrode 137. Although not connected to the divided-voltage reference voltage line 131, second storage electrodes 138 and 139 overlapping the second sub-pixel electrode 191b are provided.

A gate insulating layer 140 is provided on the gate line 121 and the divided-voltage reference voltage line 131.

A first semiconductor 154a, a second semiconductor 154b, and a third semiconductor 154c are disposed on the gate insulating layer 140.

A plurality of ohmic contacts 163a, 165a, 163b, 165b, 163c, and 165c are disposed on the semiconductors 154a, 154b, and 154c.

A data conductor including a plurality of data lines 171 including a first source electrode 173a and a second source electrode 173b, and a first drain electrode 175a, a second drain electrode 175b, a third source electrode 173c, and a third drain electrode 175c is disposed on the ohmic contacts 163a, 165a, 163b, 165b, 163c, and 165c and the gate insulating layer 140.

In an exemplary embodiment, the data conductor, and the semiconductor and the ohmic contacts provided below the data conductor, may be simultaneously provided by using a mask.

The data line 171 includes a wide end portion (not shown) for access to another layer or an external driving circuit.

The first gate electrode 124a, the first source electrode 173a, and the first drain electrode 175a provide a first TFT Qa (refer to FIG. 4) together with the first island semiconductor 154a, and a channel of the TFT is disposed on the semiconductor 154a between the first source electrode 173a and the first drain electrode 175a. Similarly, the second gate electrode 124b, the second source electrode 173b, and the second drain electrode 175b provide a second TFT Qb along with the second semiconductor 154b, and a channel is disposed on the second semiconductor 154b between the second source electrode 173b and the second drain electrode 175b, and the third gate electrode 124c, the third source electrode 173c, and the third drain electrode 175c provide a third TFT Qc along with the third semiconductor 154c, and a channel is disposed on the third semiconductor 154c between the third source electrode 173c and the third drain electrode 175c.

The second drain electrode 175b is connected to the third source electrode 173c, and includes a wide expansion 177.

A first passivation layer 180p is disposed on the data conductors 171, 173c, 175a, 175b, and 175c and the exposed semiconductors 154a, 154b, and 154c. In an exemplary embodiment, the first passivation layer 180p may include an inorganic insulating layer including a silicon nitride, a silicon oxide, or the like. The first passivation layer 180p may prevent a pigment of a color filter 230 from flowing into the exposed semiconductors 154a, 154b, and 154c.

The color filter 230 is disposed on the first passivation layer 180p. In an exemplary embodiment, the color filter 230 extends in a vertical direction along two data lines which are adjacent to each other. A first light blocking member 220 is disposed on the first passivation layer 180p, the edge of the color filter 230, and the data line 171.

The first light blocking member 220 extends along the data line 171 and is disposed between two adjacent color filters 230. In an exemplary embodiment, the first light blocking member 220 may be wider than the data line 171. As such, because the width of the first light blocking member 220 is provided to be greater than that of the data line 171, the first light blocking member 220 may prevent the light incident from the outside from reflecting from a surface of the data line 171 which includes a metal, for example. Therefore, the light reflected from the surface of the data line 171 interferes with the light transmitting through the liquid crystal layer 3 to be able to prevent a contrast ratio of the LCD from deteriorating.

A second passivation layer 180q is disposed on the color filter 230 and the first light blocking member 220.

The second passivation layer 180q may include an inorganic insulating layer including a silicon nitride, a silicon oxide, or the like. The second passivation layer 180q prevents the color filter 230 from lifting, and suppresses pollution of the liquid crystal layer 3 due to organic materials such as a solvent inflowing from the color filter 230, thereby preventing defects, such as an afterimage which may occur at the time of driving the screen, from occurring.

A first contact hole 185a and a second contact hole 185b, which expose the first drain electrode 175a and the second drain electrode 175b, respectively, are defined in the first passivation layer 180p and the second passivation layer 180q.

A third contact hole 185c, which exposes a portion of the reference electrode 137 and a portion of the third drain electrode 175c, is defined in the first passivation layer 180p and the second passivation layer 180q, and the gate insulating layer 140, in which the third contact hole 185c is defined, is covered with a connection member 195. The connection member 195 electrically connects between the reference electrode 137 and the third drain electrode 175c which are exposed through the third contact hole 185c.

A plurality of pixel electrodes 191 is disposed on the second passivation layer 180q. The pixel electrodes 191 are separated from each other, having the gate line disposed therebetween, and each includes the first sub-pixel electrode 191a and the second sub-pixel electrode 191b which are adjacent to each other in a column direction based on the gate line 121. In an exemplary embodiment, the pixel electrode 191 may include a transparent conductive material such as indium tin oxide ("ITO") and indium zinc oxide ("IZO"). In an exemplary embodiment, the pixel electrode 191 may include the transparent conductive material such as ITO and IZO, or a reflective metal such as aluminum, silver, chromium, or alloys thereof.

In an exemplary embodiment, the first sub-pixel electrode 191a and the second sub-pixel electrode 191b each include a basic pixel electrode 199 as illustrated in FIG. 7, or at least one variant thereof.

The first sub-pixel electrode 191a and the second sub-pixel electrode 191b are physically and electrically connected to the first drain electrode 175a and the second drain electrode 175b through the first and second contact holes 185a and 185b, respectively, and are applied with a data voltage from the first drain electrode 175a and the second drain electrode 175b respectively. In this case, some of the data voltage applied to the second drain electrode 175b is divided by the third source electrode 173c such that a magnitude of the voltage applied to the first sub-pixel electrode 191a may be greater than that of the voltage applied to the second sub-pixel electrode 191b.

The first sub-pixel electrode 191a and the second sub-pixel electrode 191b to which the data voltage is applied generate an electric field along with the common electrode 270 of the upper display panel 200, thereby determining alignment of the liquid crystal molecules 31 of the liquid crystal layer 3 between the two electrodes 191 and 270. The luminance of light passing through the liquid crystal layer 3 along the alignment direction of the liquid crystal molecules determined as described above is thus changed.

A second light blocking member 330 is disposed on the pixel electrode 191. The second light blocking member 330 is provided to cover a region in which the first transistor Qa, the second transistor Qb and the third transistor Qc are disposed and the first to third contact holes 185a, 185b, and 185c are defined, and extends in the same direction as the gate line 121 to overlap a portion of the data line 171. The second light blocking member 330 is disposed to at least partially overlap the two data lines 171 which are disposed at both sides of one pixel region to be able to prevent light from leaking which may occur around the data line 171 and the gate line 121 and prevent light from leaking at a region in which the first transistor Qa, the second transistor Qb, and the third transistor Qc are disposed.

Prior to forming the second light blocking member 330, the first passivation layer 180p, the color filter 230, and the second passivation layer 180q are disposed in the region in which the first transistor Qa, the second transistor Qb and the third transistor Qc are disposed and the first to third contact holes 185a, 185b, and 185c are defined, thereby easily identifying the positions of the first transistor Qa, the second transistor Qb, the third transistor Qc, and the first to third contact holes 185a, 185b, and 185c.

The upper panel 200 will now be described.

The common electrode 270 is disposed on the second insulating substrate 210. The second alignment layer 21 is disposed on the common electrode 270. In an exemplary embodiment, the second alignment layer 21 may be a vertical alignment layer, and may include the same material as the first alignment layer 11.

In an exemplary embodiment, the liquid crystal layer 3 has negative dielectric anisotropy, and the liquid crystal molecules 31 of the liquid crystal layer 3 are aligned so that a major axis thereof is perpendicular to the surfaces of the two display panels 100 and 200 in a state in which no electric field is present.

The basic pixel electrode 199 will be described with reference to FIG. 7.

As shown in FIG. 7, in an exemplary embodiment, the basic pixel electrode 199 is quadrangular, for example, and includes a cruciform stem part which is configured to include a horizontal stem part 193 and a vertical stem part 192 that is orthogonal to the horizontal stem part 193. Further, the basic electrode 199 is divided into a first sub-region Da, a second sub-region Db, a third sub-region Dc, and a fourth sub-region Dd defined by the horizontal stem part 193 and the vertical stem part 192, in which each sub-region Da to Dd includes a plurality of first minute branch parts 194a, a plurality of second minute branch parts 194b, a plurality of third minute branch parts 194c, and a plurality of fourth minute branch parts 194d, respectively.

The first minute branch part 194a obliquely extends in a leftward and upward direction from the horizontal stem part 193 or the vertical stem part 192, and the second minute branch part 194b obliquely extends in a rightward and upward direction from the horizontal stem part 193 or the vertical stem part 192. Further, the third minute branch part 194c extends in a leftward and downward direction from the horizontal stem part 193 or the vertical stem part 192, and the fourth minute branch part 194d obliquely extends in a rightward and downward direction from the horizontal stem part 193 or the vertical stem part 192.

The first to fourth minute branch parts 194a, 194b, 194c, and 194d provide an angle of approximately 45 degrees (°) or approximately 135° with respect to the gate line 121 or the horizontal stem part 193. Further, two minute branch parts among the minute branch parts 194a, 194b, 194c, and 194d of two neighboring sub-regions among the sub-regions Da, Db, Dc, and Dd may be orthogonal to each other.

Each of widths of the minute branch parts 194a, 194b, 194c, and 194d may be about 2.5 micrometers (μm) to about 5.0 μm, and an interval between the adjacent minute branch parts 194a, 194b, 194c, and 194d within one sub-region Da, Db, Dc, and Dd may be about 2.5 μm to about 5.0 μm.

According to another exemplary embodiment of the invention, the widths of the minute branch parts 194a, 194b, 194c, and 194d may be widened toward the horizontal stem part 193 or the vertical stem part 192, and a difference between a portion having the widest width and a portion having the narrowest width in one of the minute branch parts 194a, 194b, 194c, and 194d may be about 0.2 μm to about 1.5 μm.

The first sub-pixel electrode 191a and the second sub-pixel electrode 191b are connected to the first drain electrode 175a and the second drain electrode 175b, respectively, through the first and second contact holes 185a and 186b, and are applied with a data voltage from the first drain electrode 175a and the second drain electrode 175b, respectively. In this case, sides of the first to fourth minute branch parts 194a, 194b, 194c, and 194d distort an electric field to generate a horizontal component which determines an inclined direction of the liquid crystal molecules 31. The horizontal component of the electric field is substantially parallel to the sides of the first to fourth minute branches 194a, 194b, 194c, and 194d. Therefore, as illustrated in FIG. 7, the liquid crystal molecules 31 are inclined in a direction parallel with a length direction of the minute branch parts 194a, 194b, 194c, and 194d. The one pixel electrode 191 includes the four sub-regions Da, Db, Dc, and Dd in which the length directions of the minute branch parts 194a, 194b, 194c, and 194d are different from each other, and therefore the direction in which the liquid crystal molecules 31 are inclined is approximately four directions and the liquid crystal layer 3 is provided with four domains in which the alignment directions of the liquid crystal molecules 31 are different in the liquid crystal layer 3. As such, when the direction in which the liquid crystal molecules are inclined is various, a reference viewing angle of the LCD is increased.

According to the exemplary embodiment of the invention, the pinhole that may occur in the process for manufacturing an alignment layer may be repaired through a simple process, and the repair of the pinhole of the alignment layer and a layer-separated state of the periphery may be maintained so generation of bad pixels induced by repairing the pinhole is advantageously prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for repairing an alignment layer, comprising:
    forming an alignment layer by drying an alignment solution;
    determining a position of a pinhole defined in the alignment layer including a vertical functional group and a photoreactive group;
    providing a repair solution in the pinhole; and
    forming a repair layer by drying the repair solution, wherein
    the repair solution and the alignment solution include a solvent and polymers; and
    the solvent of the repair solution and the alignment solution includes at least two materials with the same content, and a polymer content of the repair solution based on a total content of the repair solution is less than a polymer content of the alignment solution based on a total content of the alignment solution.

2. The method of claim 1, wherein
the repair solution includes about 40 wt % to about 50 wt % of N-methyl pyrrolidone, about 30 wt % to about 40 wt % of butyl carbitol, about 5 wt % to about 10 wt % of polycarbonate, about 5 wt % to about 20 wt % of an additive, and about 0.5 wt % to about 1.5 wt % of the polymer regarding an entire weight of the repair solution.

3. The method of claim 2, further including
after the determining the position of the pinhole, checking whether the pinhole does or does not have a nucleus by photographing the pinhole using an optical instrument.

4. The method of claim 3, wherein
the photoreactive group includes a reactive mesogen.

5. The method of claim 4, wherein
the photoreactive group is selected from at least one of an acrylate and a methacrylate.

6. The method of claim 5, wherein
the additive of the repair solution or the alignment solution includes 3-methoxy-N,N-dimethylpropionamide.

7. The method of claim 5, wherein
viscosity of the repair solution is about 1.5 centipoise to about 3.0 centipoise.